Jan. 1, 1935.  D. A. LEFFINGWELL  1,986,273
LIFTING JACK
Filed July 2, 1932   2 Sheets-Sheet 1
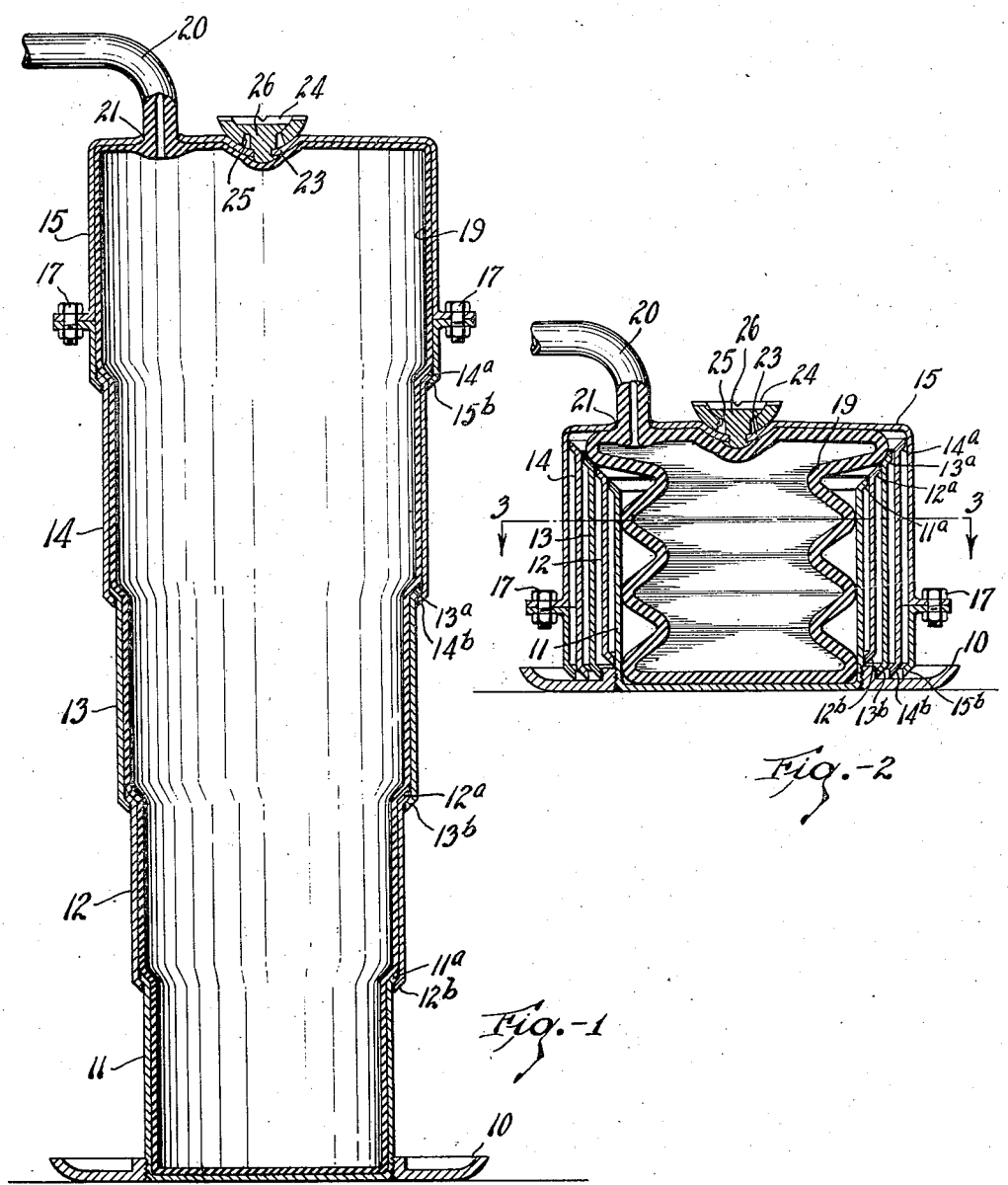
INVENTOR
DWIGHT A. LEFFINGWELL
BY  Ely & Barrow
ATTORNEYS Jan. 1, 1935.  D. A. LEFFINGWELL  1,986,273
LIFTING JACK
Filed July 2, 1932   2 Sheets-Sheet 2

INVENTOR
DWIGHT A. LEFFINGWELL
BY  Ely+Barrow
ATTORNEYS

Patented Jan. 1, 1935

1,986,273

UNITED STATES PATENT OFFICE 1,986,273

LIFTING JACK

Dwight A. Leffingwell, Alliance, Ohio

Application July 2, 1932, Serial No. 620,610

2 Claims. (Cl. 254—93)

This invention relates to lifting jacks, and more especially it relates to lifting jacks using fluid pressure for operating power.

The invention is of especial utility for use with motor vehicles, particularly passenger vehicles equipped with low pressure pneumatic tires of relatively large radial section sometimes known as "super-balloon" or "doughnut" tires. Such tires, when deflated, allow the axle of the vehicle to approach so close to the ground that it is difficult, if not impossible, to place an ordinary screw or ratchet jack in efficient operating position beneath the axle.

The chief object of the invention is to provide a lifting jack of relatively small compass when in collapsed or inoperative position. Further objects include simplicity of construction; and lightness of weight. Other objects will be manifest.

Of the accompanying drawings,

Figure 1 is a vertical section through a lifting jack embodying the invention, in its preferred form, in extended or operative position;

Figure 2 is a similar section of the device shown in Figure 1 in collapsed or inoperative position;

Figure 3:
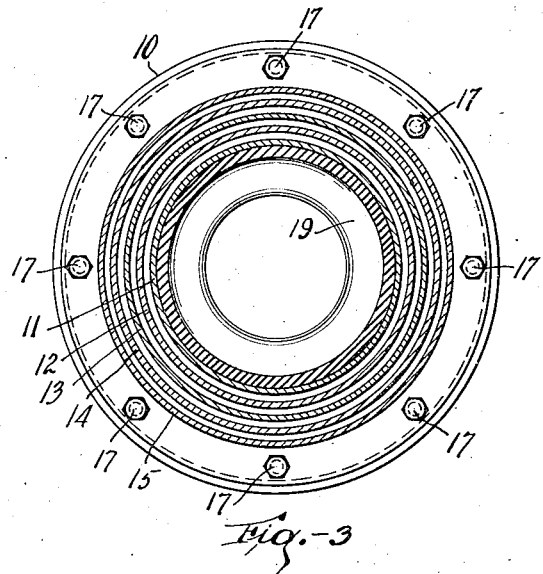
Figure 3 is a section on the line 3—3 of Figure 2.
Figure 4:
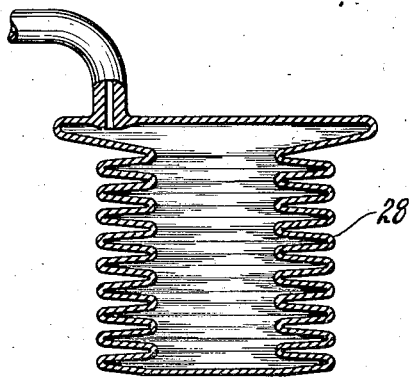
Figure 5:
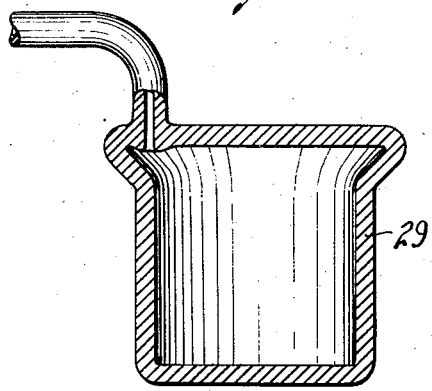
Figure 6:
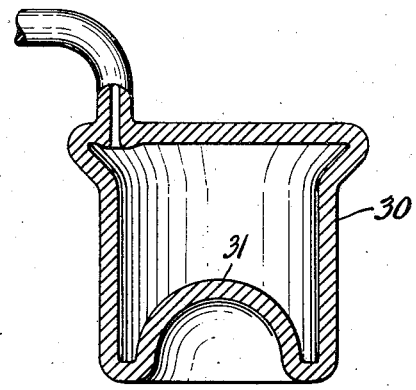

Figures 4, 5, and 6 are vertical sections through other embodiments of the fluid-holding element of the improved jack.

Referring to the drawings, 10 is a dished base member, 11 is a cup-shaped member secured to base member 10 by threading it thereinto or by other suitable means, 12, 13, and 14 are respective tubular members telescopically disposed about the member 11, and 15 is a cup-shaped member telescopically disposed about member 14. The upper marginal portions of members 11 to 14 inclusive are outwardly flared or flanged as shown in 11$^a$, 12$^a$, 13$^a$, and 14$^a$, and the lower marginal portions of members 12 to 15 inclusive are inwardly flanged as shown at 12$^b$, 13$^b$, 14$^b$, and 15$^b$. The arrangement is such as determinately to limit relative axial movement of the telescoped members in one direction, to hold them in assembled relation. The cup-shaped member 15 is transversely divided into two annular sections, the adjoining margins of which are suitably flanged, said sections being secured together by bolts 17, 17 or other suitable means. The arrangement provides convenient access to the interior of the telescopic structure.

Positioned interiorly of the telescopic structure is an elastic, expansible, impervious bag or fluid-holding casing 19 that normally is of such size as to fit nicely within the structure when the latter is in collapsed or inoperative position. The bag 19 is made of rubber, and is without reinforcement so as to be completely elastic. Preferably, it is constructed in the bellows form shown in Figure 2 so that it may be extended to an appreciable extent without subjecting its rubber structure to appreciable tension. In the fully extended position of the jack, shown in Figure 1, the bag 19 is under considerable tension, being stretched almost 100 per centum.

Fluid for distending the bag 19 is delivered thereinto through a nipple 20 that is integral with the bag and extends therefrom through an aperture 21 in the cup-shaped member 15, at one side of the axis thereof. The free end of the nipple 20 may be provided with suitable means (not shown) for connection to a source of fluid pressure, such as a manually operated pump.

The cup-shaped member 15 is axially formed with a local dished portion or socket 23 that is concave exteriorly thereof, and mounted in said socket is a concavo-convex jack plate 24 that has a relatively large axial aperture 25. The jack plate 24 is secured to the member 15 by a stud 26 having a rounded head that fits within the concave portion of the jack plate, and having a stem of smaller size than the aperture 25 that extends through said aperture and is riveted to the member 15. The arrangement provides for limited universal movement of the jack plate so that the latter may securely engage a vehicle axle disposed at an angle to the ground.

The jack as shown has a total extended height of over 11 inches, yet when collapsed is only three inches high. Thus it is easily mounted beneath a low axle, and is capable of lifting the same to sufficient height to permit the mounting of a tire thereon. The jack may be made of sheet metal to reduce its weight, and in collapsed position is small enough conveniently to fit within the ordinary tool compartment of a vehicle. Although the jack is shown with the base at the small end thereof, it will be obvious that the jack would operate equally well if reversed and have its base at its large end.

The expansible bag 28 shown in Figure 4 is of the bellows type, but has sufficient folds therein so that when mounted in the telescopic jack structure and inflated to capacity its rubber structure is under little or no tension. The other extreme condition is shown in the bag designated 29, Figure 5, which bag has no folds and is placed under tension in all operative positions of the jack. A further modification of the expansible bag structure is shown at 30, Figure 6, wherein the bottom of the bag is formed with a hemi-spherical re-entrant 31 of substantial size, which re-entrant is flattened during the expansion of the bag so that extreme tension of the rubber therein is avoided.

Other modifications may be resorted to without departing from the spirit of the invention or the scope of the appended claims, which are not limited wholly to the specific construction shown and described.

What is claimed is:

1. In a lifting jack, the combination of a hollow telescopic structure comprising a plurality of sections arranged for relative axial movement, and an inflatable bag composed entirely of elastic material disposed interiorly of said structure, said bag being distensible so as completely to fill the extended telescopic structure when it is inflated, and being so formed as to collapse and fold itself along determinate lines when deflated.

2. In a lifting jack, the combination of a hollow telescopic structure comprising a plurality of sections arranged for relative axial movement, and an inflatable bag composed entirely of elastic rubber disposed interiorly of said structure, said bag being constructed in circumferentially corrugated or bellows form so that initially upon inflation it elongates axially without appreciable stretching of the rubber, the rubber being distended into contact with the entire inner surface of the telescopic structure when the latter is fully extended.

DWIGHT A. LEFFINGWELL.